United States Patent [19]
Harwig et al.

[11] Patent Number: 5,225,654
[45] Date of Patent: Jul. 6, 1993

[54] METHOD FOR DEFECT FREE KEYHOLE PLASMA ARC WELDING

[75] Inventors: Dennis D. Harwig, Canton, Ohio; James F. Hunt, Mt. Vernon, Ind.; Patrick M. Ryan, Alliance; Walter J. Fisher, Ravenna, both of Ohio

[73] Assignee: The Babcock & Wilcox Company, New Orleans, La.

[21] Appl. No.: 914,249

[22] Filed: Jul. 15, 1992

[51] Int. Cl.$^5$ .............................................. B23K 9/00
[52] U.S. Cl. ...................... 219/121.46; 219/121.54; 219/137 R; 219/121.57
[58] Field of Search ............... 219/121.46, 121.47, 219/121.54, 121.57, 121.59, 137 R, 130.1

[56] References Cited

U.S. PATENT DOCUMENTS

| | | | |
|---|---|---|---|
| 4,023,006 | 5/1977 | West et al. | 219/121.45 |
| 4,885,455 | 12/1989 | Schultz et al. | 219/121.46 |
| 4,918,283 | 4/1990 | Yamade et al. | 219/121.46 |
| 5,045,667 | 9/1991 | Iceland et al. | 219/121.54 |

OTHER PUBLICATIONS

W. Lucas, *TIG and Plasma Welding*, Abington Publishing, England, Ch. 8 & 9, 1990.
R. L. O'Brien, *Welding Handbook-Welding Processes*, vol 2, 8th Ed., American Welding Society, Ch. 10, Plasma Arc Welding, 1991.
Oral Presentation to NASA and Aerojet Corp. on Jun. 20, 1991.

*Primary Examiner*—Mark H. Paschall
*Attorney, Agent, or Firm*—Vytas R. Matas; Robert J. Edwards; Daniel S. Kalka

[57] ABSTRACT

A plasma arc welding process for welding metal of increased thickness with one pass includes operating the plasma arc welding apparatus at a selected plasma gas flow rate, travel speed and arc current, to form a weld having a penetration ratio to weld height to weld width, and maintaining the penetration ratio at less than 0.74. Parameters for the plasma gas flow rate, travel speed and arc current are adjusted to a steady state condition during a start up period and maintained during the steady state condition to complete a weld. During a terminal stopping period, the travel speed is stopped and instantaneously replaced by filler wire which adds material to fill the keyhole that had been formed by the welding process. Parameters are subsequently adjusted during the stopping period to terminate the weld in a sound manner.

7 Claims, 4 Drawing Sheets

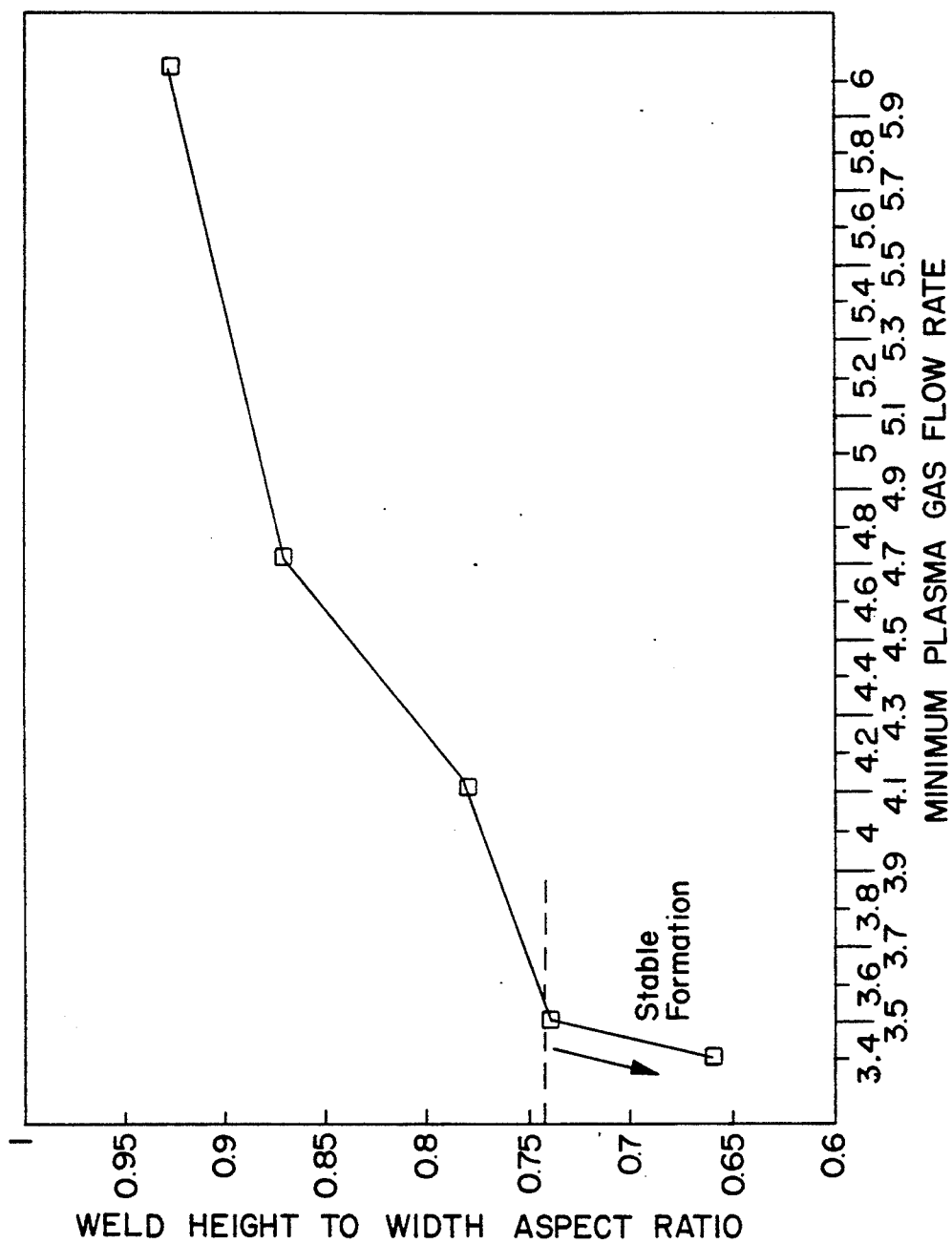

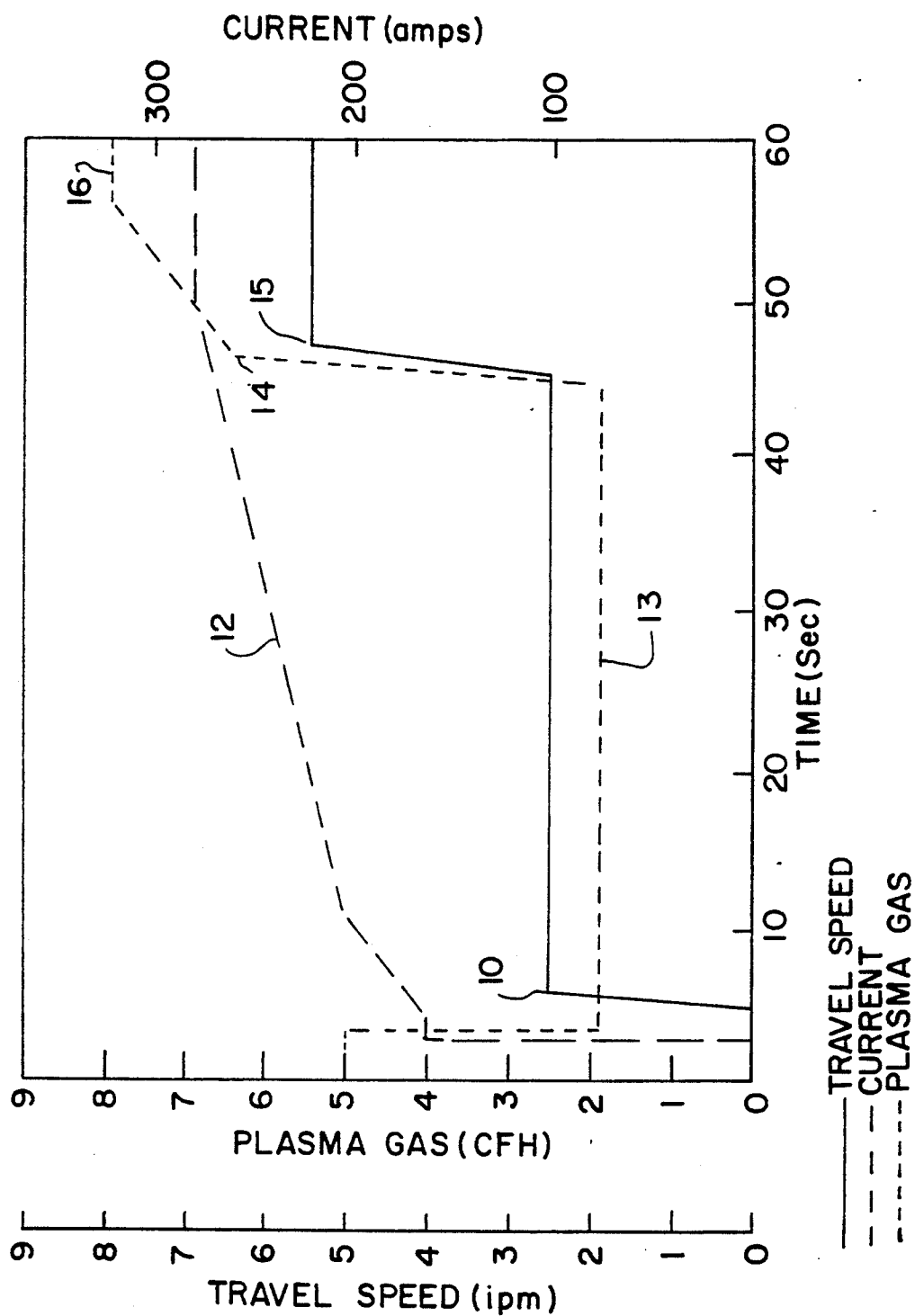

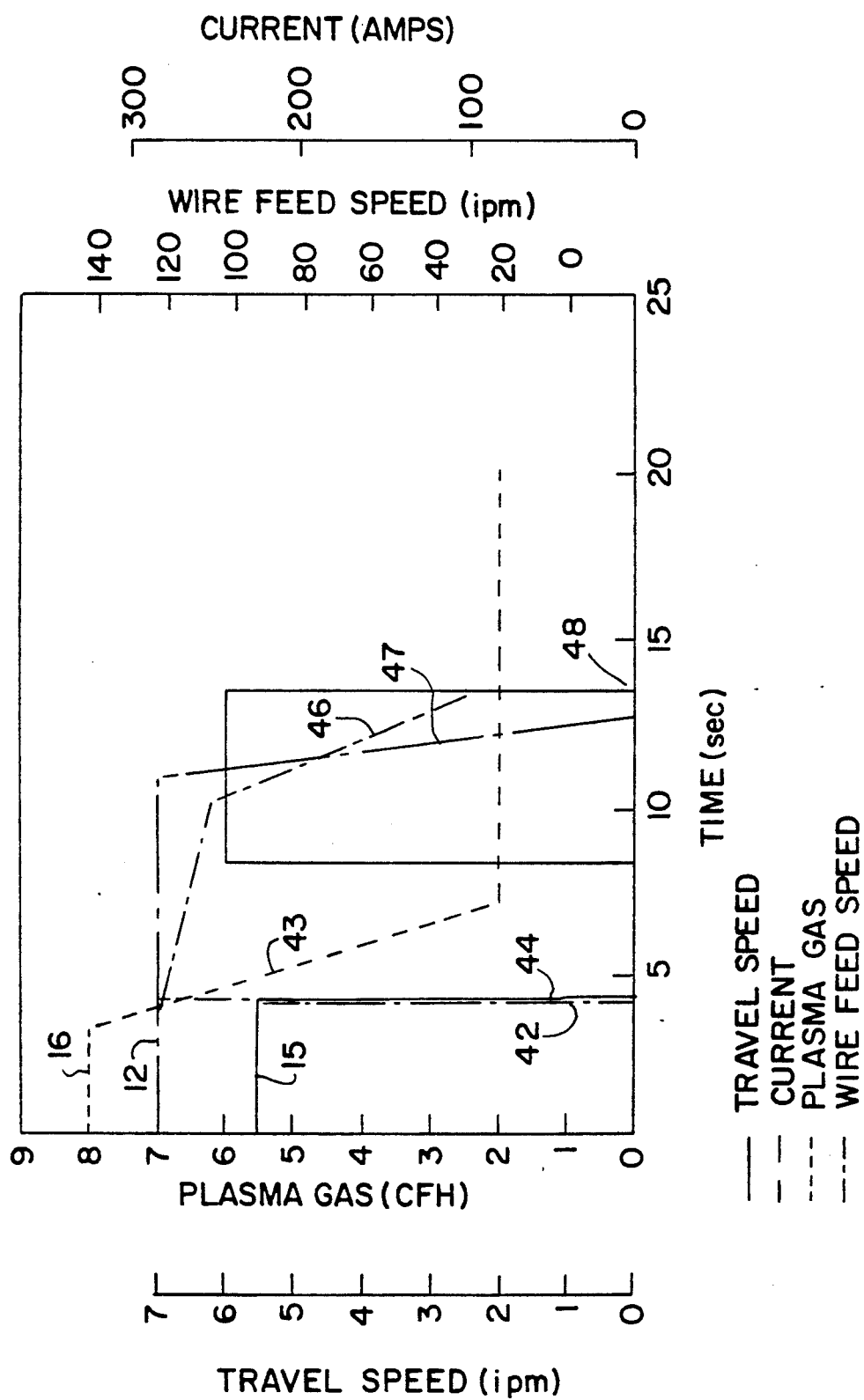

METHOD FOR DEFECT FREE KEYHOLE PLASMA ARC WELDING

This invention was made with Government support under Contract No. NAS8-37800, subcontract Nos. WE10E3640N and 10000-1 awarded by the National Aeronautics and Space Administration (NASA). The Government has certain rights in this invention.

BACKGROUND OF THE INVENTION

1. Field of the Invention

The present invention relates in general to the field of welding, and in particular to a new and useful process for conducting PAW on thicker steel stock than was previously possible.

2. Description of the Related Art

Plasma Arc Welding (PAW) is an arc welding process that produces coalescence of metal by heating with a constricted arc between an electrode and the workpiece (transferred arc) or between the electrode and the constricting nozzle (nontransferred arc). Shielding is generally obtained from the hot, ionized gas issuing from the torch. This plasma gas is usually supplemented by an auxiliary source of shielding gas. Shielding gas may be a single inert gas or a mixture of inert gases. Pressure is not applied, and filler metal may or may not be added.

Plasma arc welding, like gas tungsten arc welding (GTAW), uses a nonconsumable electrode. The PAW torch has a nozzle that creates a gas chamber surrounding the electrode. The arc heats the gas fed into the chamber to a temperature where it becomes ionized and conducts electricity. This ionized gas is defined as plasma. Plasma issues from the nozzle orifice at a temperature of about 30,000° F. (16,700° C.). See R. L. O'Brien, *Welding Handbook — Welding Processes*, Volume 2, 8th Edition, by the American Welding Society, Chapter 10—Plasma Arc Welding.

Two types of plasma arc welds can be made; melt-in welds and keyhole welds. The melt-in plasma arc welding process has a lower power density and produces a weld pool similar to the gas tungsten arc welding process. The keyhole plasma arc welding process is considered a high power density welding process since the arc has the capacity to penetrate through a thickness of material and make welds autogenously. The power density of the plasma arc welding process is controlled by the plasma gas flow rate where the higher the flow rate the higher the power density. However, at too high a power density and plasma gas flow rate the process will cut the material into two pieces rather than welding it into one piece.

The main advantages of keyhole PAW over the melt-in PAW or GTAW process is that the greater penetration capabilities of the keyhole PAW process reduces the number of weld passes required to fill the joint. In many cases, the weld can be completed in a single pass. In steels, the maximum thickness which can be welded with the keyhole PAW process on a square groove butt joint is reported to be 0.25 inch for single pass welds. See W. Lucas, *TIG and Plasma Welding*, Abington Publishing, England, Chapters 8 and 9, 1990. As the thickness of the joint increases over 0.25 inch, a multi-pass weld procedure is used where a groove, either a V or U, is machined into the base material with the point member butt land of thickness of no more than 0.25 inch. In multi-pass welds, the keyhole PAW process is used to weld the root pass and the melt-in PAW process is used to fill the joint groove.

In steels at thicknesses greater than 0.25 inch, the keyhole PAW process has not been used to weld the entire thickness in one pass because the catastrophic breakdown of the keyhole weld pool results in either partial plate penetration, excessive porosity, cutting and/or disfigured welds. At these thicknesses steady state welding with the keyhole PAW processes is quite difficult. Even more difficult is the control of transient conditions of the keyhole PAW process; i.e., the initiation and termination of the keyhole PAW mode. U.S. Pat. No. 4,885,455 discloses a process for terminating closed through-hole plasma arc welding.

SUMMARY OF THE INVENTION

The process of the present invention is for starting, maintaining and terminating the keyhole PAW process on steels thicker than 0.250 inch without forming defects. Specifically a preferred form of the invention is a process developed for autogenously keyhole welding thicknesses between 0.400 and 0.437 inch of HP 9Ni-4Co-0.30C high strength steel.

Weld parameters of the invention are designed specifically for each part of the process to control weld soundness. The first part of the process is the starting of the keyhole plasma arc. Historically, weld parameters are ramped over a period of time to their steady state magnitudes. On steels 0.400 through 0.437 inch thick, it was found that this type of procedure was completely inadequate. The transition from the melt-in mode to the keyhole mode left large voids in the deposited weld. This was partly due to the volume of liquid metal which must be displaced under stable conditions to establish the cavity of the keyhole weld pool. Tests have been conducted and a relationship determined for evaluating the effects of melt-in mode pool shape on keyhole mode starting. These tests varied the weld pool height relative to the weld pool width as a function of the minimum plasma gas flow rate for keyhole starting. The height of the weld pool was equal to the land thickness at the time of keyhole initiation. Stable keyhole mode starting was determined by the shape of the as-deposited weld and the weld soundness. According to the invention, a stable keyhole requires a weld height-to-width ratio of less than 0.74. At aspect ratio levels greater than 0.74, trapped gas defects were observed in the keyhole start during inspection. At aspect ratio levels greater than 1.0 height-to-width, the weld was disfigured and many defects were observed in the keyhole start.

The use of the keyhole PAW process and the invention has the following advantages over conventional keyhole PAW:

An autogenous full penetration weld can be made with the keyhole PAW process in steels up to 0.437 inch thick. The literature reports that the maximum thickness of steel which can be welded with the keyhole PAW process is 0.250 inch. The inventive process relates the shape and size of the melt-in PAW process to the sound starting of the keyhole PAW process. This process produces weld starts which are free of porosity and have good weld shape. The invention soundly stops the keyhole PAW process by precise weld parameter control of the keyhole closure and weld solidification. The number of weld passes required to fill joints thicker than 0.250 inch has been reduced from multi-passes to one pass with the process of the invention. Since the process has a sound weld start and weld stop, it can be used to weld pressure boundary circular weld seams which require 100% of the weld to be defect free. The process builds on the fundamental relationship between the melt-in mode weld pool shape and the starting stability of the keyhole mode. Therefore, this process can easily be adapted to materials other than steels over a large range of thicknesses. The process controls the nature of solidification in the closure of the keyhole to resist shrinkage void formation. The control of solidification in this process is generic such that it can work on materials other than steel which are keyhole PAW welded.

Accordingly, an object of the present invention is to provide a plasma arc welding process for welding metal of increased thickness with fewer passes, comprising the steps of: operating a plasma arc welding apparatus at a selected plasma gas flow rate, travel speed and arc current to form a weld having a penetration ratio of weld height to weld width, and maintaining the penetration ratio at less than about 0.74.

Another object of the present invention is to provide such a plasma arc welding process wherein the gas flow rate, travel speed and arc current are controlled within desired limits during a start-up, steady state and stopping period for producing sound PAW results, in particular by providing a feed wire as filler during the stop period only to compensate for and fill the keyhole formed during a keyhole mode of the process.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

BRIEF DESCRIPTION OF THE DRAWINGS

In the drawings:

FIG. 2 is a graph plotting penetration ratio against minimum plasma gas flow rate showing the preferred range for the present invention;

FIG. 3 is a graph plotting travel speed and plasma gas flow against time for starting the process according to the present invention;

FIG. 4 is a graph similar to FIG. 3 showing the stopping process of the present invention;

DESCRIPTION OF THE PREFERRED EMBODIMENTS

Figure 5:
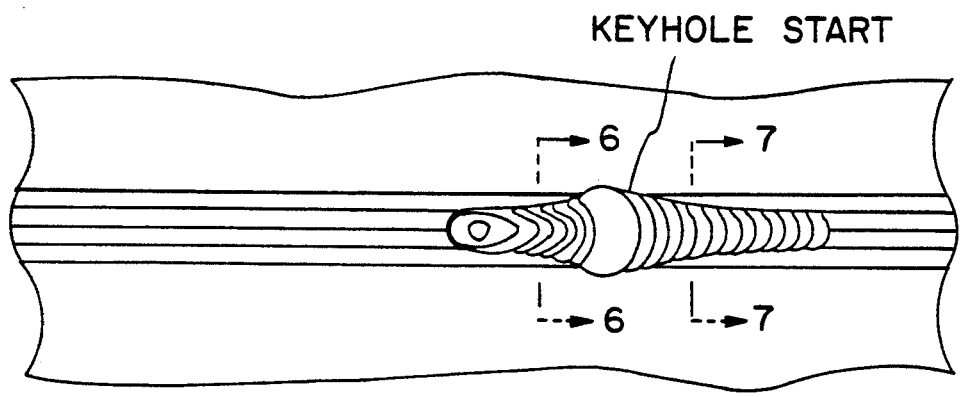
FIG. 5 is a top plan view of the welding area.

Referring to FIG. 2 in particular, a stable keyhole requires a weld height-to-width ratio of less than 0.74. As noted above, various adverse effects occur above this ratio.

Based on tests, it was found that the best keyhole starts were obtained with the procedure shown in FIG. 3. This procedure controlled the rate of weld pool growth until the proper weld pool width and shape was obtained then initiated the keyhole PAW mode. Once the keyhole weld pool was initiated, weld parameters were changed to the values required for steady state welding.

The keyhole starting process or start-up period shown in FIG. 3 has four primary variables; travel speed, plasma gas flow, current and time. There are other parameters in the plasma arc welding process but these parameters are typically fixed based on the prior art. These are known as secondary variables and include the shielding gas, arc length, orifice diameter, tungsten size and shape, preheat temperature, etc.

For this disclosure, ipm means inches per minute; and CFH means cubic feet per hour.

The starting process in FIG. 3 is based on using a slower than normal travel speed 10 (2 to 3 ipm) so the current at 12 can be increased within the capabilities of the power supply and build the weld pool of desired shape. During this time, the plasma gas flow rate (13) is kept at a melt-in mode magnitude (1.5 to 2.5 CFH) until the weld pool has the proper size and shape, then the plasma gas flow is increased rapidly to keyhole magnitude at (14) (6 to 7 CFH). Shortly after the keyhole mode is initiated the travel speed is increased to steady state levels (15) (5 to 6 ipm). Then, the plasma gas flow rate is ramped over several more seconds up to point (16), to strengthen the keyhole mode. At the end of the sequence the weld parameters are all in the steady state and are maintained at this level until the weld enters the termination or stopping sequence of the process illustrated in FIG. 4. An illustration of the weld shape during the keyhole starting process is shown in FIG. 1.

Preferred keyhole mode conditions which are steady state are advantageously from 7.5 to 8.5 CFH for plasma gas flow, 250 to 300 amps for current and 5 to 6 ipm travel speed.

Figure 1:
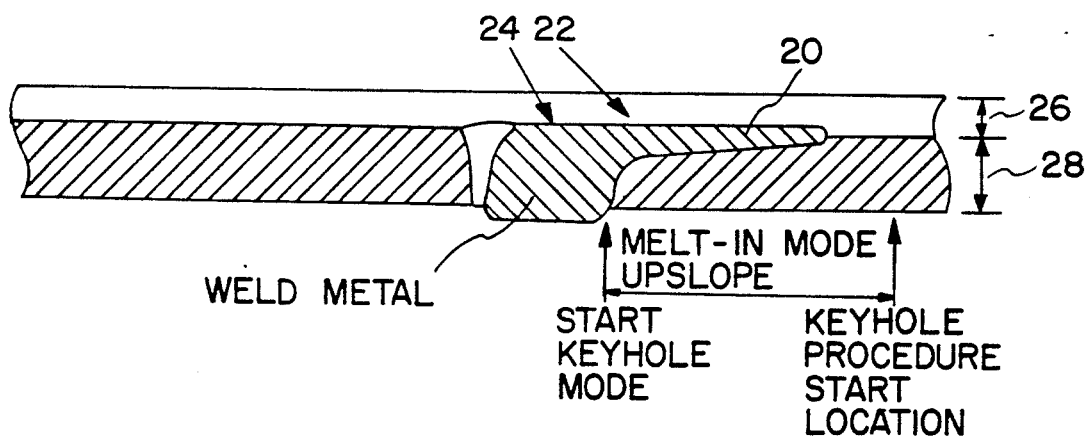
FIG. 1 is sectional view of a weld area showing the melt-in mode of welding and its gradual conversion into the keyhole mode of welding.

The weld shown in FIG. 1 starts and grows in size at (20) until the proper melt-in mode weld pool (22) is obtained. Then the keyhole mode is established penetrating the entire thickness of base material at keyhole (24). This figure illustrates the use of a groove (26) in addition to the 0.400 to 0.437 inch land (28) for welding joint thickness greater than 0.437 inch.

Figure 7:
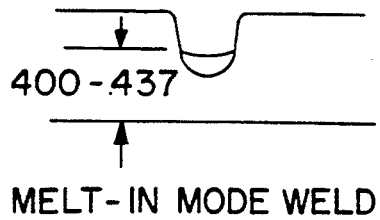
FIG. 7 is a sectional view of the weld taken along line 7—7 of FIG. 5
Figure 6:
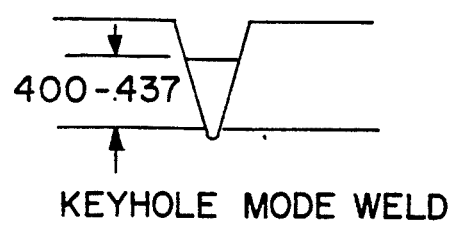
FIG. 6 is a sectional view of the weld taken along line 6—6 of FIG. 5.

FIGS. 5, 6 and 7 are respective top plan and two sectional views of the weld area showing between FIGS. 7 and 6, the increasing depth from the melt-in mode to the keyhole mode weld.

Keyhole PAW is a quite sound process in the steady state mode. However, one of the limitations of this process on steels thicker than 0.250 inch is terminating or stopping the process soundly. The process of the invention can soundly stop the keyhole mode of the PAW process on steels thicker than 0.250 to 0.437 inch thick, specifically on HP 9Ni-4Co-.30C high strength steel between 0.400 to 0.437 inch thick. The problem of stopping the keyhole PAW process is that the keyhole has a definite volume which increases with land thickness. This volume must be replaced under stable conditions so that the keyhole weld stop is completely sound. Shrinkage cracks, porosity and poor bead shape are some of the defects which commonly plague the soundness of a weld stop of the keyhole PAW process.

Historically, the steady state weld parameters are decreased in magnitude to stop the PAW process. This type of procedure is insufficient on steels thicker than 0.250 inch. The keyhole PAW process of the invention is made autogenously (no filler) and the keyhole weld pool is characterized by a cavity of a finite volume through the base material thickness. In steels of thickness between 0.250 and 0.437 inch, the volume of the cavity of the keyhole weld pool is such that a supplemental filler is needed during keyhole termination. The process of the invention is shown in FIG. 4 and stops the keyhole PAW process by instantaneously stopping travel speed at (42) and initiating a filler wire speed (44) of sufficient magnitude to compensate for the volume of the keyhole cavity and at the same time decreases the plasma gas flow rate (43) to magnitudes in the PAW melt-in mode (1.5 to 2.5 CFH). Then, travel speed is restarted at (45) to riser the weld pool; like a small casting, and enhance the keyhole stop soundness as the wire feed speed and current are decreased completely to stop the PAW process at (46, 47). This procedure was found to completely eliminate the two most common defects in keyhole PAW stops; porosity and shrinkage cracks.

The keyhole stopping process of FIG. 4 has five variables; travel speed, current, plasma gas flow, wire feed speed and time. Secondary variables to the plasma arc process are fixed and do not effect the nature of this invention. The keyhole stopping process shown in FIG. 4 begins at steady state weld parameter magnitudes for the plasma gas flow, travel speed, and current (16, 15 and 12). At the beginning of this process, the travel speed magnitude is instantaneously stopped and the wire feed magnitude is started (42, 44). Then the plasma gas is lowered in magnitude to melt-in PAW levels (43). During this time the keyhole cavity is filled with filler wire such that porosity does not form. At the same time as the plasma gas magnitude is being decreased, the current magnitude is being decreased but at a slower rate to assist the fill of the keyhole cavity. Once the keyhole PAW cavity is nearly full, the travel speed is instantaneously started in sufficient magnitude to raise the melt-in weld pool which formed on top of the former keyhole cavity (45). This measure increases the resistance to shrinkage cracks by changing the direction of weld pool solidification. Once the melt-in weld pool leaves the former area of the point where the keyhole cavity was filled, the wire feed magnitude decreases and at the same time the rate of current decrease changes to a higher rate to taper the size of the weld down to a size where cracks cannot form when the PAW process stops (47). Then the travel speed is instantaneously stopped as the current decreases to zero stopping the PAW process (48).

The keyhole PAW of the invention was developed for PAW fabrication of HP 9Ni-4Co-.30c steel rocket motor cases. This process is suitable for any material on any application where arc welding is a candidate process and weld quality is most important. Specifically, this process is desirable for application where single pass welds need to be made on material thicknesses between 0.250 and 0.437 inch. Thicker welds can be made by using a joint design which employs a groove above a land of no more than 0.437 inch thick. At thicknesses greater than 0.437, a multi-pass weld procedure would be used.

While the specific embodiments of the invention have been shown and described in detail to illustrate the application of the principles of the invention, it will be understood that the invention may be embodied otherwise without departing from such principles.

What is claimed:

1. An improved plasma arc welding process for a plasma arc welding apparatus operating with weld parameters of travel speed, plasma gas flow, and current, comprising the steps of:
   providing a start-up period which includes maintaining the travel speed at a slower than normal rate while ramping the current upwardly to a steady state and maintaining a plasma gas flow rate at a melt-in mode magnitude for a predetermined time;
   increasing rapidly the plasma gas flow rate after the predetermined time to a first set point of keyhole magnitude;
   increasing the travel speed to a steady state level;
   ramping the plasma gas flow rate over a predetermined time interval up to a second higher steady state set point for strengthening the keyhole mode; and
   operating the weld parameters at steady state to form and maintain a weld having a weld height to weld width ratio at less than about 0.74.

2. An improved plasma arc welding process according to claim 1, wherein the operating step includes the steady state having the plasma gas flow rate of between about 7.5 to 8.5 CFH, a current of between about 250 to 300 amps, and a travel speed of between about 5 to 6 ipm.

3. An improved plasma arc welding process according to claim 1, further comprising the step of terminating welding during a stop period by reducing the travel speed to zero and at substantially the same time, introducing a filler wire at a rate sufficient to compensate for a keyhole formed during the steady state.

4. An improved plasma arc welding process according to claim 3, further including the step of gradually reducing the plasma gas flow rate up to about the point which the keyhole is filled by filler wire, and thereafter increasing the travel speed.

5. An improved plasma arc welding process according to claim 1, wherein the start-up period includes the steps of having the plasma gas flow rate initially at about 1.5 to 2.5 CFH, the arc current being ramped upwardly from an initial value of between about 175 to 225 amps to a range between about 250 to 300 amps, and the travel speed being constant at about 2 to 3 ipm.

6. An improved plasma arc welding process according to claim 1, wherein during a stop period subsequent to the steady state period, the travel speed is reduced to zero, wire feed is introduced into the weld at a rate to compensate and fill the keyhole formed during the steady period, and the plasma gas flow rate is gradually reduced.

7. An improved plasma arc welding process according to claim 6, wherein after the keyhole is filled, further comprising the steps of increasing the travel speed to between about 5 and 7 ipm and subsequently discontinuing the feeding of wire followed by reducing the travel speed to zero again.

* * * * *